United States Patent [19]

Buxbaum et al.

[11] 4,315,849

[45] Feb. 16, 1982

[54] FLAME-RESISTANT PLASTICS MOULDING MATERIAL

[75] Inventors: Lothar Buxbaum, Lindenfels, Fed. Rep. of Germany; Jürgen Habermeier, Pfeffingen, Switzerland; Franz Breitenfellenr, Bensheim; Thomas Kainmüller, Lindenfels, both of Fed. Rep. of Germany

[73] Assignee: Ciba-Geigy Corporation, Ardsley, N.Y.

[21] Appl. No.: 180,264

[22] Filed: Aug. 22, 1980

[30] Foreign Application Priority Data

Aug. 28, 1979 [DE]   Fed. Rep. of Germany ....... 7797/79

[51] Int. Cl.³ ............................................... C08K 5/34
[52] U.S. Cl. .......................... 260/45.75 B; 260/37 N; 260/37 R; 260/40 R; 260/45.75 W
[58] Field of Search ............ 260/37 N, 40 R, 45.75 B, 260/45.75 W, 45.8 NH

[56] References Cited

U.S. PATENT DOCUMENTS

| | | | |
|---|---|---|---|
| 2,149,494 | 3/1939 | Ballauf | 548/305 |
| 2,742,447 | 4/1956 | Fanning et al. | 260/45.8 NH |
| 3,403,036 | 9/1968 | Hindersinn et al. | |
| 3,405,136 | 10/1968 | Wright | 548/305 |
| 3,499,085 | 3/1970 | Sasse et al. | 424/273 B |
| 3,624,024 | 11/1971 | Caldwell et al. | |
| 3,954,790 | 5/1976 | Habermeier | |
| 3,997,510 | 12/1976 | Habermeier | |
| 4,011,194 | 3/1977 | Sandler | 260/45.8 NH |
| 4,056,508 | 11/1977 | Schmidt et al. | 260/45.75 B |
| 4,108,841 | 8/1978 | Habermeier et al. | |

FOREIGN PATENT DOCUMENTS 2751969   6/1978   Fed. Rep. of Germany .
1298880  12/1972   United Kingdom .

OTHER PUBLICATIONS

CA, 89, 111402q, 1978.

Primary Examiner—John Kight, III
Assistant Examiner—R. A. White
Attorney, Agent, or Firm—Luther A. R. Hall

[57] ABSTRACT

Flame-resistant plastics moulding material formed from a polymer, preferably a thermoplast, and a halogenated benzimidazolone or halogenated benzimidazolone derivative, such as N,N'-di-(2-hydroxyethyl)-4,5,6,7-tetrabromobenzimidazolone or 4,5,6,7-tetrabromobenzimidazolone calcium, as a flame-resistant agent. The flame-resistant agent is added to the polymer at any suitable stage of production by a simple mixing together of the constituents, whereby this flame-resistant agent must not react chemically with the polymer.

10 Claims, No Drawings

FLAME-RESISTANT PLASTICS MOULDING MATERIAL

The invention relates to a flame-resistant plastics moulding material containing a polymer and a halogenated benzimidazoline as a fire-retarding agent. The moulding material, which can also contain customary additives and fillers, is intended for the production of moulded articles, particularly those produced by the injection moulding of thermoplastic compounds. These materials are used in the electrical industry, in the automobile industry, for producing household goods, and so forth.

The adding of non-reactive, monomeric or polymeric substances having a fire-retarding action to plastics moulding materials is known. The demands made of such substances having a fire-retarding action are however high. The substances need to be colourless, easy to mix in, compatible with the polymer, and stable to heat and to light, and should moreover have no unfavourable effect on the physical properties of the plastics material; furthermore, they must not migrate and have to be nontoxic. Substances which satisfy all these requirements are not known, for the reason in particular that relatively large amounts of substances of this kind have to be added to the polymer for the flame-retarding action to be extended to the whole of the plastics material.

There have already been used for specific thermoplastic materials additives which for many purposes are satisfactory. For example, the addition of polyvinyl chloride to acrylonitrile-butadiene-styrene terpolymers enables a noninflammable plastics materials having high impact strength and good dimensional stability under heat to be obtained. On the other hand, the instability to heat limits the use of this mixture in the injection moulding process.

Also additions of low-molecular halogenated compounds of cycloaliphatic structure, such as the endocyclic compounds known from the U.S. Pat. No. 3,403,036, have an excellent flame-resistant action with only slight impairment of the physical properties of the polymer. These compounds too however have inadequate heat stability for the production of plastics requiring the application of high temperatures.

Other products effective in small amounts by virtue of a high halogen content, such as hexabromobenzene, pentabromotoluene and hexabromobiphenyl, as well as decabromobiphenyl known from the British Pat. No. 1,298,880, are indeed sufficiently thermostable, but they tend to migrate at high temperatures.

In order to avoid the stated disadvantages, reactive flameproofing agents are incorporated into the polymers during their production. There are known for example from the U.S. Pat. No. 3,997,510 noninflammable thermoplastic polyesters formed from terephthalic acid, isophthalic acid or aliphatic dicarboxylic acids and aliphatic diols, which contain halogenated benzimidazolones incorporated by condensation. The impairment of the physical properties can in this way be reduced to a minimum. The polyesters thus obtained have a surprisingly high level of heat resistance. The production of products of this type is however expensive, and difficulties are frequently involved in that precise production conditions have to be maintained; and, furthermore, certain properties, for instance, crystallisability, can be impaired.

It has now been shown that the addition of halogenated benzimidazolones to plastics materials to form a purely mechanical mixture leads to the obtainment of products which have properties as good as those of products made from plastics materials without an additive, and which at the same time are flame-resistant.

The invention relates therefore to a flame-resistant plastics material which contains at least one polymer and, in an amount of 5 to 30 percent by weight relative to the polymer, a halogenated benzimidazolone of the formula I

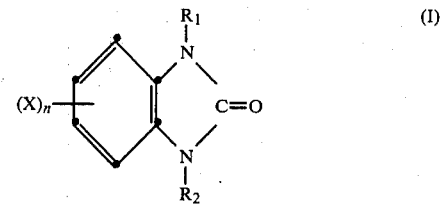

wherein X is chlorine and/or bromine, n is a number from 1 to 4 inclusive, and $R_1$ and $R_2$ independently of one another are each —H, —CH$_2$OH, —CH$_2$—CH$_2$OH, $$-CH_2-CH-OH,$$
$$\quad\quad\quad\;|$$
$$\quad\quad\;\;CH_3$$

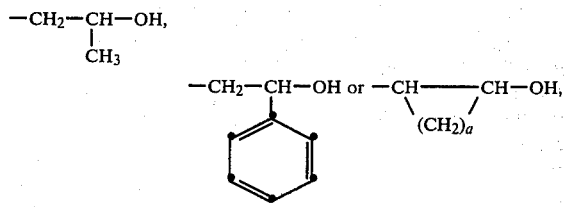

in which a is 3 or 4; or $R_1$ and $R_2$ are each CH$_2$—CH$_2$—COOR$_3$ or —CH$_2$—COOR$_3$, in which R$_3$ is H, alkyl having 1 to 18 C atoms, an alkali metal or an equivalent of an alkaline-earth metal or zinc compound; or $R_1$ and $R_2$ are each an alkali metal or an equivalent of an alkaline-earth metal or zinc compound.

The plastics moulding material preferably contains 10 to 20 percent by weight of a compound of the formula I, relative to the polymer.

In the formula I, n is preferably the number 3 or 4, and X is in particular bromine. Compounds of the formula I preferably used are those wherein $R_1$ and/or $R_2$ are hydrogen or an equivalent of a calcium compound.

Preferably used are thermoplastic polymers, especially polyesters based on aliphatic, cycloaliphatic and/or aromatic dicarboxylic acids and aliphatic, cycloaliphatic and/or aromatic diols.

Polyesters regarded as forming a technically important group are in particular those containing, relative to the polyester, at least 25 mol %, preferably 40 mol %, of terephthalic acid radicals, and at least 25 mol %, preferably 40 mol %, of alkylenediol radicals. The straight-chain or branched-chain alkylenediol radicals can contain 2 to 12, preferably 2 to 6, C atoms, and are especially ethylene glycol or 1,4-butylene glycol radicals. Further polyesters are described for example in the German Offenlegungsschrift No. 2,751,969.

Other usable thermoplastic materials are for example polymers which are derived from unsaturated hydrocarbons, such as polyethylene, polybutadiene or polystyrene, also copolymers of such olefins and mixtures of such polymers; in addition halogen-containing hydrocarbons, such as polychloroprene and polyvinyl chloride; and also polymers and copolymers derived from unsaturated α,α-unsaturated carboxylic acids, such as polyacrylates, polyacrylamides, polyacrylonitrile, ABS resins, also polyvinyl alcohol, polyacetates, polyphenylene oxides, polysulfones, polycarbonates and polyamides.

A compound of the formula I can also be added to the starting materials or preliminary products of elastomeric or duroplastic materials, for example of polyurethanes, alkyd resins, formaldehyde condensation products with urea, melamine or phenol, or epoxide resins.

The compounds of the formula I and the production thereof are known, for example from U.S. Pat. No. 3,954,790. They can be added to the polymer at any suitable stage of production, the only condition being that they do not chemically react with the polymer. Thus, diols of the formula I could not be added to the starting materials used for the production of polyesters without them being incorporated by condensation. The flame-resistant agent is usually added to the finished polymer by a simple mixing together. Any suitable mixing device can be used for the purpose, for example a tumbler mixer. The flame-resistant agent has to be added to elastomeric or duroplastic material before the curing of the moulded articles, since it cannot be mixed into the finished crosslinked material.

The compounds of the formula I can be used together with synergistically acting compounds of the fifth main group of the periodic system. To be mentioned among these are in particular the phosphorus and antimony compounds, for example phosphates or especially antimony trioxide. The amount thereof added to the polymer is usually about 1 to 20 percent by weight, relative to the polymer.

The plastics moulding materials can moreover contain other customary fillers, in particular also reinforcing fillers, for example pigments, optical brighteners, crystallisation-promoting agents, lubricants, plasticisers, and so forth. As a reinforcing filler are used especially glass fibres, for example in an amount of 5 to 60 percent by weight, particularly 10 to 40 percent by weight, relative to the total amount of material.

The plastics moulding materials according to the invention are either already shaped articles, for example when duroplasts are concerned, or materials which are to be moulded by customary methods, such as by casting, injection moulding, and so forth.

The novel moulding compounds are suitable in particular as "engineering plastics materials", which are suitable for producing moulded articles, such as gear wheels, containers for chemicals or for foodstuffs; machine parts and parts of apparatus, films, sheets and plates; and also for producing semifinished products, which can be machined. They are also suitable for the coating of objects, for example by the known powder-coating processes.

EXAMPLE 1

Polybutyleneterephthalate + 4,5,6,7-tetrabromobenzimidazolone (a) Production of polybutyleneterephthalate (PBT):

3000 g of dimethylterephthalate, 2800 g of butanediol-1,4 and 1.78 g of titanium tetraisopropylate are placed into a 10-liter reaction vessel provided with stirrer, nitrogen inlet and separating column. While the mixture is being stirred and nitrogen passed through, 98.5% of the theoretical amount of methanol is distilled off within 4½ hours, in the course of which the temperature of the reaction mixture rises to 200° C. The mixture is then transferred to a second reaction vessel. A vacuum of 0.5 Torr is applied within 1½ hours and the reaction temperature is simultaneously raised to 250° C. The reaction is finished after a further 3 hours; the melt is extruded through nozzles into the form of strands; the strands are quenched in water at 18° C., and subsequently reduced to a colourless cylindrical granulate 2 mm × 3 mm, which has a relative viscosity of 2.13.

(b) Production of 4,5,6,7-tetrabromobenzimidazolone (A):

134.1 g of benzimidazolone are suspended in 4 liters of glacial acetic acid and 1 liter of water at room temperature in a 6-liter sulfonating flask. There are then added dropwise 479 g of bromine, in the course of which the internal temperature rises to about 40° C. After completion of the dropwise addition, the internal temperature is raised within about 2 hours to 110° C. (reflux). After a further 5 hours' stirring at reflux temperature, the reaction mixture is slowly cooled overnight with stirring. The solid reaction product is filtered off with suction and washed with water. The reaction product can be recrystallised from tetrahydrofuran; the melting point is above 300° C.

(c) 55 parts by weight of PBT are mixed dry in a tumbler mixer with 10 parts by weight of A,
30 parts by weight of glass fibres (Owens Corning, Type OCF CS 429 YZ) and
5 parts by weight of $Sb_2O_3$, and the mixture is granulated at a temperature of 240° by means of an extruder. After drying at 100° C. for 10 hours, the granulate is injection moulded into the form of test specimens, the temperature rising from 220° C. in the inlet zone to 260° C. in the outlet zone. The specimens are subsequently tested, according to ASTM 2863, with respect to their flammability. The value 34 is obtained for the Limiting Oxygen Index (LOI).

(d) Comparative Test

A mixture of 57 parts by weight of PBT, 8 parts by weight of decabromodiphenyl, 5 parts by weight of $Sb_2O_3$ and 30 parts by weight of glass fibres is processed as described under (c) and then tested. The test specimen of which the bromine content is identical to that in the plastics material according to the invention gives an LOI of 31.

EXAMPLE 2

Polyamide 6 + 4,5,6,7-tetrabromobenzimidazolone (a) Production of polyamide 6: it is produced by known methods from caprolactam.

(b) Production of 4,5,6,7-tetrabromobenzimidazolone: see Example 1 and (b).

(c) The same procedure is carried out as described under 1(c). The temperature in the injection moulding machine is 240° to 250° C.

The LOI is 28.

EXAMPLE 3

Polyamide 6 + N,N'-di-(2-hydroxyethyl)-4,5,6,7-tetrabromobenzimidazolone (a) Production of polyamide 6: in the known manner.

(b) Production of N,N'-di-(2-hydroxyethyl)-4,5,6,7-tetrabromobenzimidazolone: the compound is produced in the manner described in U.S. Pat. No. 3,954,790, Example 1.

(c) The further procedure is carried out in a manner analogous to that described under 2(c).

An LOI of 26 is measured.

EXAMPLE 4

Polypropylene+N,N'-di-(2-hydroxyethyl)-4,5,6,7-tetrabromobenzimidazolone (a) Production of polypropylene: an atactic polymer is produced in the customary manner.

(b) N,N'-di-(2-Hydroxyethyl)-4,5,6,7-tetrabromobenzimidazolone is produced as described under 3(b), (c) The procedure is carried out as described under 1(c), the temperature in the injection-moulding machine being 210° to 230° C.

The LOI measured is 21.

EXAMPLE 5

Polybutyleneterephthalate+4,5,6,7-tetrabromobenzimidazolone calcium (a) Production of PBT: see 1(a).

(b) Production of 4,5,6,7-tetrabromobenzimidazolone calcium.

270 g of tetrabromobenzimidazolone (0.6 mol) and 48 g of NaOH (1.2 mols) in 1000 ml of water are heated to reflux. To the formed solution are added, with vigorous stirring, 131.4 g of calcium chloride hexahydrate (0.6 mol) dissolved in 500 ml of hot water (90° C.). After cooling to room temperature, the reaction product which has precipitated is filtered off under suction, washed with 500 ml of water and 500 ml of hot tetrahydrofuran, and dried for 5 hours at 150° C./1 mbar. The yield is 272 g of colourless crystalline product which does not melt below 320° C.

Elementary analysis: $Ca_{cal.}$ (for $C_7Br_4CaN_2O$): 8.2%, $Ca_{found}$: 7.8%.

(c) 82 parts by weight of PBT are mixed with 10 parts by weight of the calcium compound (b) and 8 parts by weight of $Sb_2O_3$. The mixture is then processed in the manner described under 1(a).

The product obtained gives an LOI of 32.

What is claimed is:

1. A flame-resistant plastics molding composition which comprises
    (a) at least one polymer other than a polysulfone in admixture with
    (b) 5 to 30% by weight of said polymer of a halogenated benzimidazolone of formula I

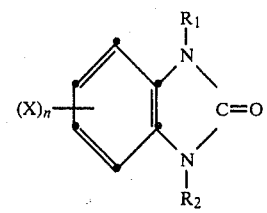

wherein X is chlorine, bromine or a mixture thereof, n is a number from 1 to 4 inclusive, and $R_1$ and $R_2$ independently of one another are each hydrogen, —$CH_2OH$, —$CH_2$—$CH_2OH$,

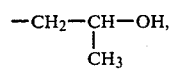

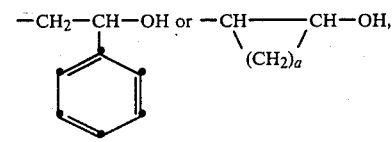

in which a is 3 or 4; or $R_1$ and $R_2$ are each —$CH_2CH_2COOR_3$ or —$CH_2COOR_3$ in which $R_3$ is hydrogen, alkyl having 1 to 18 C atoms, an alkali metal ion, one equivalent of an alkaline earth metal ion or one equivalent of zinc ion; or $R_1$ and $R_2$ are each an alkali metal ion, one equivalent of an alkaline earth metal ion, or one equivalent of zinc ion; with the proviso that none of component (b) chemically reacts with said polymer (a).

2. A composition according to claim 1, which contains as polymer a thermoplastic material.

3. A composition according to claim 2, which contains a polyester based on an aliphatic, cycloaliphatic and/or aromatic dicarboxylic acid and an aliphatic, cycloaliphatic and/or aromatic diol.

4. A composition according to claim 3, wherein the polyester contains at least 25 mol % of terephthalic acid radicals, and at least 25 mol % of alkylenediol radicals having 2 to 12 C atoms, relative to the polyester.

5. A composition according to claim 2, which contains as thermoplast a polyamide.

6. A composition according to claim 1, wherein n in the formula I is 3 or 4.

7. A composition according to claim 6, wherein X in the formula I is bromine.

8. A composition according to claim 1, wherein $R_1$ and/or $R_2$ in the formula I are hydrogen or an equivalent of a calcium ion.

9. A composition according to claim 1, which contains, relative to the polymer, 1 to 20 percent by weight of $Sb_2O_3$.

10. A composition according to claim 1, which contains, relative to the total material, 10 to 40 percent by weight of glass fibres.

* * * * *